US010126423B1

(12) United States Patent
Fowler et al.

(10) Patent No.: US 10,126,423 B1
(45) Date of Patent: Nov. 13, 2018

(54) METHOD AND APPARATUS FOR STOPPING DISTANCE SELECTION

(71) Applicant: GM GLOBAL TECHNOLOGY OPERATIONS LLC, Detroit, MI (US)

(72) Inventors: Bryan Fowler, Shelby Township, MI (US); Mohannad Murad, Troy, MI (US)

(*) Notice: Subject to any disclaimer, the term of this patent is extended or adjusted under 35 U.S.C. 154(b) by 6 days.

(21) Appl. No.: 15/677,636

(22) Filed: Aug. 15, 2017

(51) Int. Cl.
*B60W 50/08* (2012.01)
*G01S 13/93* (2006.01)
*G08G 1/16* (2006.01)

(52) U.S. Cl.
CPC .......... *G01S 13/931* (2013.01); *B60W 50/08* (2013.01); *G08G 1/165* (2013.01); *B60R 2300/802* (2013.01); *B60R 2300/8093* (2013.01)

(58) Field of Classification Search
CPC .......... G01S 13/931; G01S 2013/9314; G01S 2013/9317; G01S 2013/9378; G01S 17/936; G08G 1/165; G08G 1/04; G08G 1/167; G08G 1/09675; B60W 50/08; B60R 2300/802; B60R 2300/8093; B60R 2300/301; B60R 2300/307; B60R 2300/20; B60R 2300/202; B60R 2300/205; B60R 2300/207; B60R 2300/806; B60R 1/00; B60R 1/02; B60R 1/002
See application file for complete search history.

(56) References Cited

U.S. PATENT DOCUMENTS

| 7,843,767 | B2* | 11/2010 | Hayasaka | G01S 7/52004 367/99 |
| 8,131,440 | B2* | 3/2012 | Kameyama | B60W 30/08 701/70 |
| 8,451,107 | B2* | 5/2013 | Lu | B60Q 9/005 340/435 |
| 8,600,673 | B2* | 12/2013 | Nakamura | B60R 1/00 701/23 |
| 9,073,482 | B2* | 7/2015 | Yamamoto | H04N 7/185 |
| 9,126,525 | B2* | 9/2015 | Lynam | B60Q 9/005 |
| 9,280,824 | B2* | 3/2016 | Fukuda | G06T 7/0042 |
| 9,701,307 | B1* | 7/2017 | Newman | B60W 30/09 |
| 9,796,332 | B2* | 10/2017 | Lu | B60Q 9/005 |
| 9,807,352 | B2* | 10/2017 | Lambert | H04N 7/183 |
| 2015/0109444 | A1* | 4/2015 | Zhang | B60Q 9/008 348/148 |
| 2017/0039437 | A1* | 2/2017 | Park | G06K 9/00805 |
| 2017/0355307 | A1* | 12/2017 | Ha | G08G 1/143 |

* cited by examiner

*Primary Examiner* — Joseph Feild
*Assistant Examiner* — John Mortell (57) ABSTRACT

A method and apparatus for stopping distance selection are provided. The method includes displaying an image from a camera facing an area around a vehicle, detecting a selection of an object in the image, determining a stopping distance from the selected object, and performing an operation if the vehicle is within of a threshold distance of the stopping distance.

20 Claims, 4 Drawing Sheets

METHOD AND APPARATUS FOR STOPPING DISTANCE SELECTION

INTRODUCTION

Apparatuses and methods consistent with exemplary embodiments relate to detecting a distance between two objects. More particularly, apparatuses and methods consistent with exemplary embodiments relate to detecting a distance between two objects and performing a function corresponding to the detected distance.

SUMMARY

One or more exemplary embodiments provide a method and an apparatus that receive a selection of an object or a selection of a setting for a stopping distance, and that perform a function corresponding to one or more from among the selected object and the set stopping distance. More particularly, one or more exemplary embodiments provide a method and an apparatus that perform a function if a vehicle is within a predetermined distance of a selected stopping distance between the vehicle and the selected object.

According an aspect of an exemplary embodiment, a method for setting stopping distance is provided. The method includes displaying an image from a camera facing an area around a vehicle, detecting a selection of an object in the image, determining a stopping distance from the selected object, and performing an operation if the vehicle is within a threshold distance of the stopping distance.

The determining the stopping distance may include receiving an input including the stopping distance from an operator of the vehicle.

The receiving the input may include receiving the input via a touch screen display.

The receiving the input via the touch screen display may include displaying a slider configured to adjust the stopping distance and receiving a touch input at the slider.

The method may also include highlighting the selected object to visually distinguish a portion of the image including the selected object from another portion of the image.

The performing the operation if the vehicle is within the threshold distance of the stopping distance may include outputting a sound alerting an operator of the vehicle or a visual alert to the operator of the vehicle.

The performing the operation if the vehicle is within the threshold distance of the stopping distance may include engaging a brake of the vehicle or stopping the vehicle.

The performing the operation if the vehicle is within of a threshold distance of the stopping distance may include providing haptic feedback to an operator of the vehicle.

The method may also include highlighting a plurality of objects in the image, and the detecting the selection of the object in the image may include detecting the selection of the object from among the plurality of highlighted objects in the image.

According an aspect of an exemplary embodiment, an apparatus for setting stopping distance is provided. The apparatus includes at least one memory comprising computer executable instructions; and at least one processor configured to read and execute the computer executable instructions. The computer executable instructions may cause the at least one processor to display an image from a camera facing an area around a vehicle, detect a selection of an object in the image, determine a stopping distance from the selected object, and perform an operation if the vehicle is within a threshold distance of the stopping distance.

The computer executable instructions may cause the at least one processor to determine the stopping distance by receiving an input including the stopping distance from an operator of the vehicle.

The computer executable instructions may cause the at least one processor to receive the input via a touch screen display.

The computer executable instructions may cause the at least one processor to receive the input via a displayed slider configured to adjust the stopping distance according to a touch input at the slider.

The computer executable instructions may cause the at least one processor to highlight the selected object to visually distinguish a portion of the image including the selected object from another portion of the image.

The computer executable instructions may cause the at least one processor to perform the operation if the vehicle is within the threshold distance of the stopping distance by outputting a sound alerting an operator of the vehicle.

The computer executable instructions may cause the at least one processor to perform the operation if the vehicle is within the threshold distance of the stopping distance by providing haptic feedback to an operator of the vehicle or a visual alert to the operator of the vehicle.

The computer executable instructions may cause the at least one processor to perform the operation if the vehicle is within the threshold distance of the stopping distance by engaging a brake of the vehicle or stopping the vehicle or controlling the vehicle to move to distance that is within the threshold distance of the stopping distance.

The computer executable instructions may cause the at least one processor to highlight a plurality of objects in the image, and detect the selection of the object in the image from among the plurality of highlighted objects in the image.

According an aspect of an exemplary embodiment, an apparatus for setting stopping distance is provided. The apparatus includes at least one memory comprising computer executable instructions; and at least one processor configured to read and execute the computer executable instructions. The computer executable instructions cause the at least one processor to receive an image from a camera facing an area around a vehicle, display the image representing the area around a vehicle, detect a selection of an object in the image representing the area around a vehicle, set a stopping distance between the selected object and the vehicle; and send the set stopping distance to the vehicle to perform an operation if the vehicle is within a threshold distance of the stopping distance.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

An apparatus and method for selecting an object in an image and setting a stopping distance from the selected object will now be described in detail with reference to FIGS. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles and other machines now include various sensors and devices that provide information to automate tasks. The sensors and devices also provide valuable information to the operator to operate the vehicle or machine. One example of information provided by the sensors or devices may be information on a distance between a machine and an object. This information is useful to an operator because it allows an operator to move the machine, for example a vehicle, to a desired distance with respect to the object. However, when a plurality of objects are present in a vicinity near a machine, it may not be clear which object of objects should be used for the distance measurement.

To address the above issue, operators of a vehicle may view an image provided by a camera showing the plurality of objects, e.g. a rear view camera or a rear-facing camera. The plurality of objects may be detected by a sensor or by the camera and they may be highlighted to show an operator that they may be selected. The operator may then select one of the plurality of objects in the image and set a desired stopping distance between the machine operated by the operator and the object. A function may then be performed to move the machine to the desired stopping distance from the selected object, to notify the operator of the proximity to the desired stopping distance, and/or to notify the desired stopping distance is reached.

Figure 1:
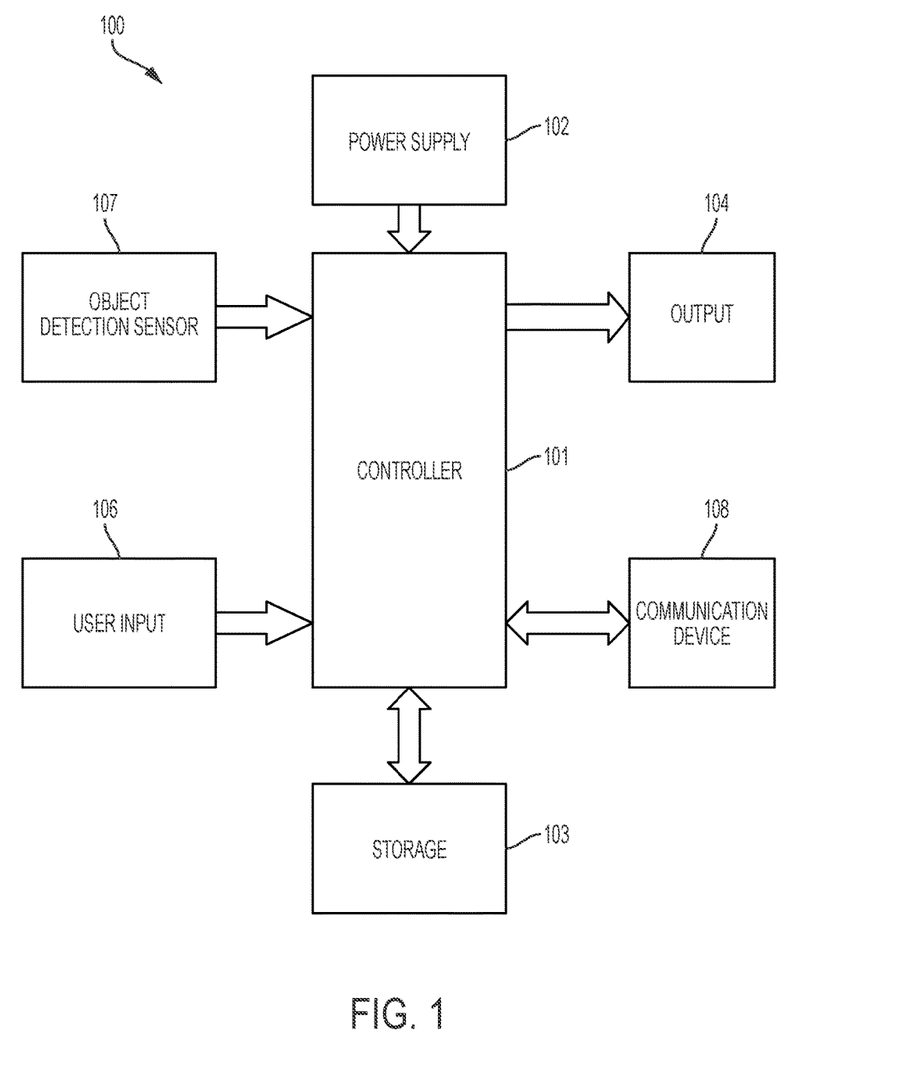
FIG. 1 shows a block diagram of an apparatus that sets a stopping distance according to an exemplary embodiment.

FIG. 1 shows a block diagram of an apparatus for setting stopping distance 100 according to an exemplary embodiment. As shown in FIG. 1, the apparatus for setting stopping distance 100, according to an exemplary embodiment, includes a controller 101, a power supply 102, a storage 103, an output 104, a user input 106, an object detection sensor 107, and a communication device 108. However, the apparatus for setting stopping distance 100 is not limited to the aforementioned configuration and may be configured to include additional elements and/or omit one or more of the aforementioned elements. The apparatus for setting stopping distance 100 may be implemented as part of a vehicle, as a standalone component, as a hybrid between an on vehicle and off vehicle device, or in another computing device.

The controller 101 controls the overall operation and function of the apparatus for setting stopping distance 100. The controller 101 may control one or more of a storage 103, an output 104, a user input 106, an object detection sensor 107, and a communication device 108 of the apparatus for setting stopping distance 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the object detection sensor 107, and the communication device 108 of the apparatus for setting stopping distance 100. The controller 101 may control to steer, move or apply the brake of the vehicle to automate the movement of the vehicle to achieve the stopping distance that was selected by the operator by sending and/or receiving information including commands and controls to/from the appropriate vehicle component, module, ECU, etc. The information may be sent and received via a bus or network, or may be directly read or written to/from one or more of the storage 103, the output 104, the user input 106, the object detection sensor 107, and the communication device 108 of the apparatus for setting stopping distance 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

According to an example, the controller 101 may receive information from one or more from among a camera, an accelerometer, a speedometer, an ultrasonic sensor, an odometer, a radar sensor, and a wheel speed sensor. The information from one or more of an accelerometer, a speedometer, an ultrasonic sensor, an odometer, a radar sensor, and a wheel speed sensor may be used to determine a distance traveled by a vehicle or a distance from a vehicle to an object selected on the display by the operator.

The power supply 102 provides power to one or more of the controller 101, the storage 103, the output 104, the user input 106, the object detection sensor 107, and the communication device 108, of the apparatus for setting stopping distance 100. The power supply 102 may include one or more from among a battery, an outlet, a capacitor, a solar energy cell, a generator, a wind energy device, an alternator, etc.

The storage 103 is configured for storing information and retrieving information used by the apparatus for setting stopping distance 100. The storage 103 may be controlled by the controller 101 to store and retrieve information received from the object detection sensor 107. The information may include information on objects detected by the object detection sensor 107, an object selected by the operator, a distance between the selected object and a vehicle, image information of images taken by the object detection sensor 107, information of an accelerometer, a speedometer, an ultrasonic sensor, an odometer, a radar sensor, or a wheel speed sensor. The storage 103 may also include the computer instructions configured to be executed by a processor to perform the functions of the apparatus for setting stopping distance 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus for setting stopping distance 100. In addition, the output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc.

The output 104 may display an image showing the plurality of objects. The plurality of objects displayed on the output may be highlighted or visually distinguished to indicate that they are selectable and that a stopping distance can be set with respect to a highlighted object. Once one of the highlighted objects is selected, the output 104 may visually distinguish the selected object to indicate that the desired stopping distance is to be set from the selected object. The output 104 may then output or display a setting menu or graphical user interface that is used by the operator set the stopping distance from the selected object.

The output 104 may also output notification including one or more from among an audible notification, a light notification, and a display notification. The notification may indicate that the machine or vehicle is within a predetermined threshold distance of the desired stopping distance or is at the desired stopping distance. In addition, the output 104 may output a graphical display showing the proximity to the desired stopping distance or an audible alert that becomes louder as a machine moves closer to the desired stopping distance. The output 104 may also output haptic feedback once a machine reaches the desired stopping distance or that increases in intensity as the machine moves closer to the desired stopping distance.

The user input 106 is configured to provide information and commands to the apparatus for setting stopping distance 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to select the object used for determining the stopping distance and to set the desired stopping distance.

The object detection sensor 107 may include one or more from among a plurality of sensors including an imaging sensor, a camera, a laser sensor, an ultrasonic sensor, an infrared camera, a LIDAR, a radar sensor, an ultra-short range radar sensor, an ultra-wideband radar sensor, and a microwave sensor. The object detection sensor 107 may provide one or more images from one or more cameras such as a rear-facing cameras and/or information from sensors that may be analyzed to detect a plurality of objects used for the stopping distance measurement. The information from object detection sensor 107 may then be analyzed to determine a distance from a selected object from among the plurality of objects. The distance determination is compared to the desired stopping distance to determine when a machine or vehicle is at the stopping distance.

The communication device 108 may be used by the apparatus for setting stopping distance 100 to communicate with various types of external apparatuses according to various communication methods. The communication device 108 may be used to send/receive information including information on a plurality of objects detected by the object detection sensor 107, information from the object detection sensor 107 such as image information, information on vehicle dynamics such as vehicle velocity and vehicle trajectory, information of an accelerometer, a speedometer, an ultrasonic sensor, an odometer, a radar sensor, and/or a wheel speed sensor. The storage 103 may also include the computer instructions configured to be executed by a processor to perform the functions of the apparatus for setting stopping distance 100. The information received via the communication device 108 may analyzed to determine distance from an object.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus for setting stopping distance 100 may be configured to display an image from a camera facing an area behind a vehicle, detect a selection of an object in the image, determine a stopping distance from the selected object, and perform an operation if the vehicle is within of a threshold distance of the stopping distance.

The controller 101 of the apparatus for setting stopping distance 100 may be configured to determine the stopping distance by receiving an input including the stopping distance from an operator of the vehicle. In addition, the controller 101 of the apparatus for setting stopping distance 100 may be configured to receive the input via a touch screen display. For example, the controller 101 of the apparatus for setting stopping distance 100 may be configured to receive the input via a displayed slider configured to adjust the stopping distance according to a touch input at the slider.

The controller 101 may also be configured to highlight the selected object to visually distinguish a portion of the image including the selected object from another portion of the image. Moreover, the controller 101 may be configured to detect a plurality of objects in the image and highlight the plurality of objects for selection by operator.

The controller 101 may also be configured to perform the operation if the vehicle is within the threshold distance of the stopping distance by performing one or more from among outputting a sound alerting an operator of the vehicle, providing haptic feedback to an operator of the vehicle via a steering wheel or a seat, providing visual feedback via a display such as a heads up display or center console display, or controlling the vehicle to move to distance that is within the threshold distance of the stopping distance.

Figure 2:
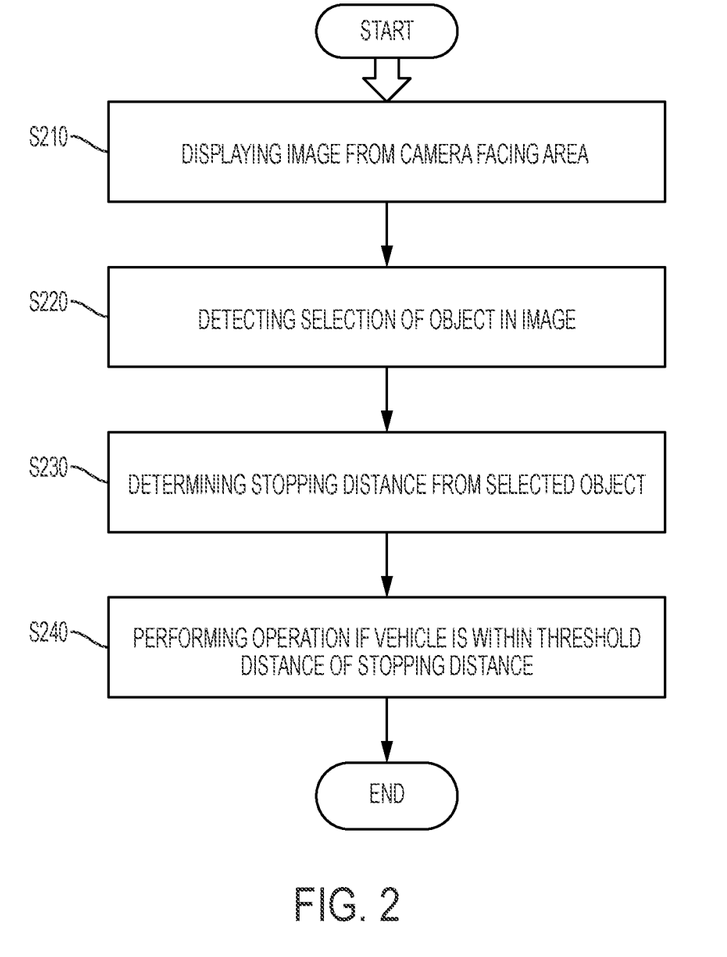
FIG. 2 shows a flowchart for a method for setting stopping distance according to an exemplary embodiment.

FIG. 2 shows a flowchart for a method for setting stopping distance according to an exemplary embodiment. The method of FIG. 2 may be performed by the apparatus for setting stopping distance 100 or may be encoded into a computer readable medium as instructions that are executable by a computer to perform the method.

Referring to FIG. 2, an image captured from a camera facing an object is displayed in operation S210. The image may be of an area behind a vehicle and may include a plurality of objects such as another vehicle, doors, a ramp, a bumper, etc. In operation S220, a selection of one of the plurality of objects in the image is detected. The selection may be made via a touch screen or user input 106. The plurality of objects may be automatically detected and highlighted in the captured imaged. Moreover, the selection may cause the selected object to be colored different or to be visually distinguishable from the plurality of objects in the displayed image.

The stopping distance from the selected object is determined in operation S230. The stopping distance may be a pre-stored value input by an operator. In addition, the operator may be prompted to input the stopping distance via a touch screen or user input 106. In one example, the operator may be presented with a displayed graphical object that may be controlled by the operator via the touch screen to set the stopping distance. The graphical object may be a slider or an object configured to increment or decrement a stopping distance setting.

After the stopping distance is determined, an operation may be performed based on the stopping distance or if the vehicle is within a threshold distance of the stopping distance in operation S240. The operation may include one or more of engaging a brake of the vehicle or stopping the vehicle, outputting a sound alerting an operator of the vehicle that the stopping distance has been reached, providing haptic feedback to an operator of the vehicle via a steering wheel or seat, providing visual feedback via a display such as a heads up display, and controlling the vehicle to move to distance that is within the threshold distance of the stopping distance.

Figure 3:
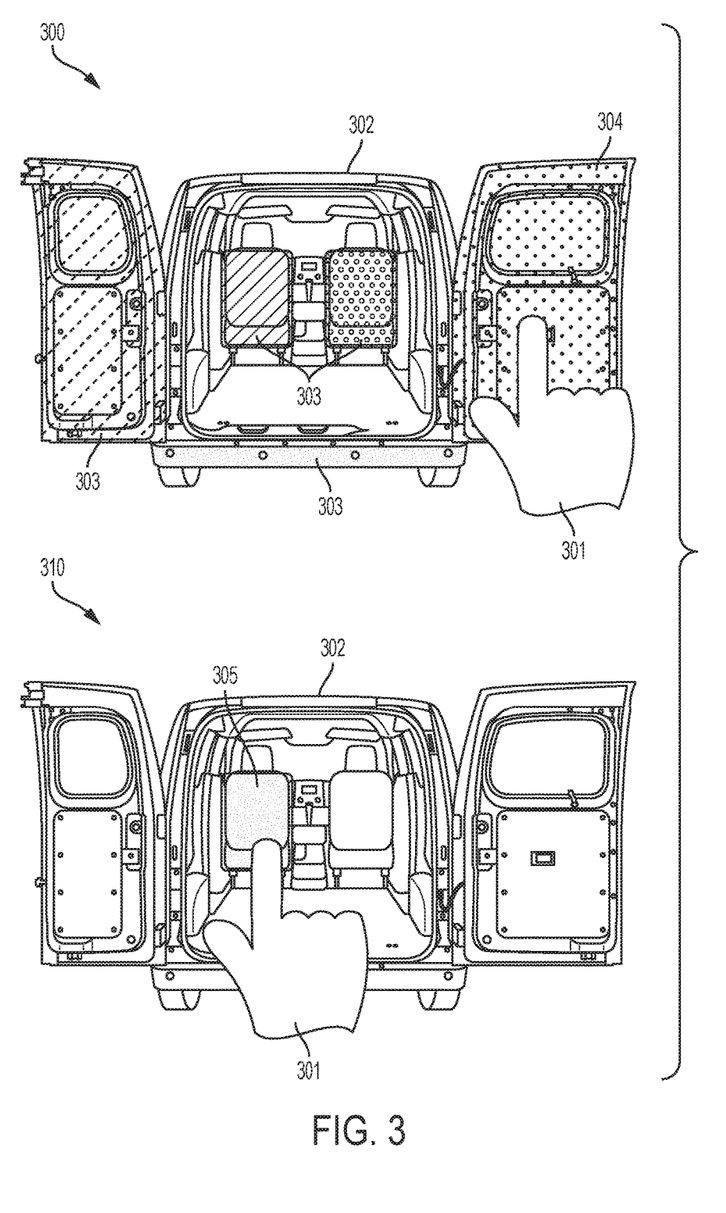
FIG. 3 shows an illustration of a user interface for selecting an object in an image according to an aspect of an exemplary embodiment.

FIG. 3 shows an illustration of a user interface for selecting an object in an image according to an aspect of an exemplary embodiment.

Referring to FIG. 3, an image 300 taken by a camera is displayed to an operator is shown. The image shows a plurality of highlighted objects 303 that are part of the vehicle 302. The plurality of highlighted objects 303 in image 300 have been pre-detected as potential reference points from which the stopping distance may be measured. An operator may select an object displayed using a finger 301, input device or other object. In this case, the operator selects the rear right door 304 as the reference point from which the stopping distance is to be measured.

In image 300, the plurality of objects are not highlighted or pre-selected. In this case, the operator selects left front seat 305 as the reference point from which the stopping distance is measured. In response to the selection of the reference point object in image 300 and 310, the display may visually distinguish the selected reference point object.

Figure 4:
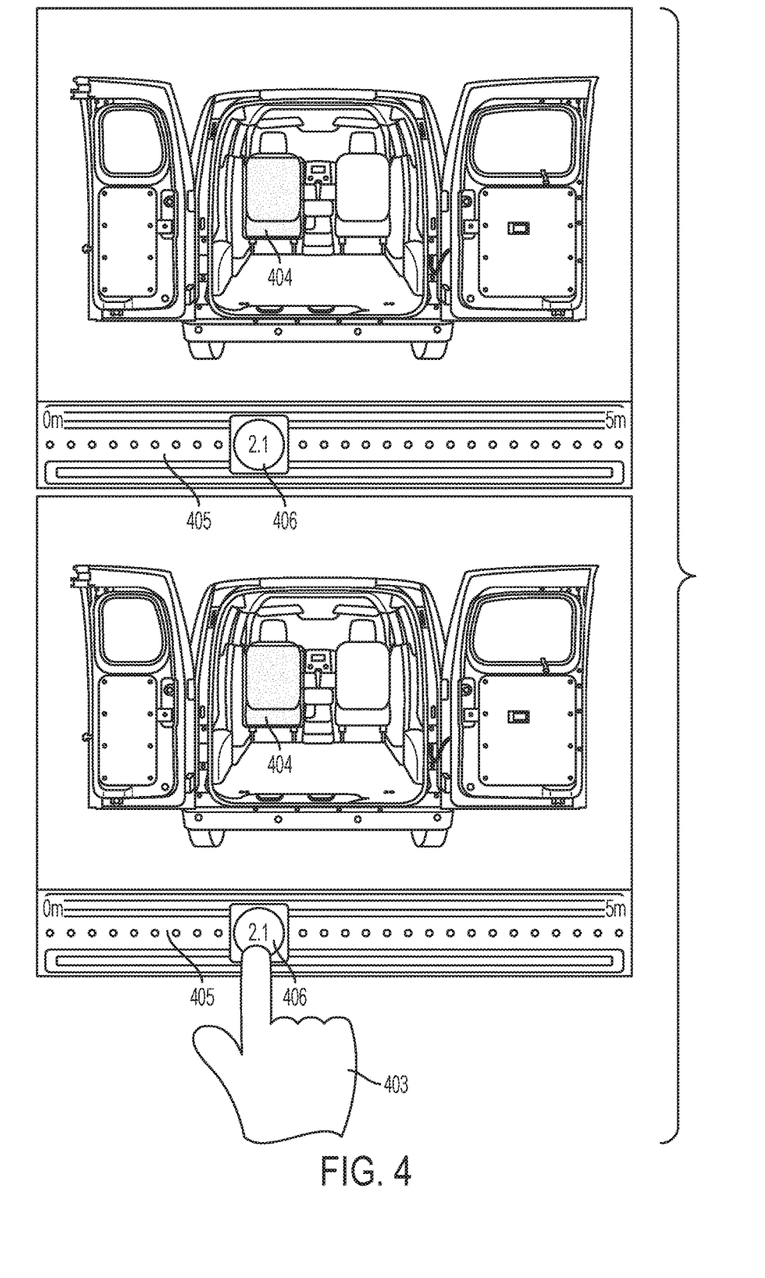
FIG. 4 shows an illustration of a user interface for setting a stopping distance from a selected object according to an aspect of an exemplary embodiment.

FIG. 4 shows an illustration of a user interface for setting a stopping distance from a selected object according to an aspect of an exemplary embodiment. The method of setting a stopping distance shown in FIG. 4 is only an example and other methods of entering a stopping distance setting may be used such as a numerical input using buttons or a touch-screen, a dial configured to increase or decrease the setting as it rotates, increment or decrement icon(s) configured to increase or decrease the setting if selected by an operator.

Referring to FIG. 4, an operator may move a slider 406 along setting bar 405 using a finger 403, device or other object. Alternatively, an operator may select a position on the setting bar 405 to indicate a stopping distance measurement. In this case, the setting is displayed in slider 406. The stopping distance setting in FIG. 4 would then be set with respect to the left front seat.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for setting stopping distance, the method comprising:
   displaying, on a display, an image from a camera facing an area around a vehicle;
   detecting a user input to select an object in the displayed image;

determining a stopping distance from the selected object, the stopping distance corresponding to a pre-stored value or an input received from an operator of the vehicle;

comparing a distance to the selected object and the stopping distance, the distance to the selected object being determined from information provided by an object detection sensor; and based on the comparing, performing an operation if the vehicle is within a threshold distance of the stopping distance.

2. The method of claim 1, wherein the determining the stopping distance comprises receiving an input including the stopping distance from the operator of the vehicle.

3. The method of claim 2, wherein the receiving the input comprises receiving the input via a touch screen display.

4. The method of claim 3, wherein the receiving the input via the touch screen display comprises displaying a slider configured to adjust the stopping distance and receiving a touch input at the slider.

5. The method of claim 1, further comprising highlighting the selected object to visually distinguish a portion of the image including the selected object from another portion of the image.

6. The method of claim 1, wherein the performing the operation if the vehicle is within the threshold distance of the stopping distance comprises outputting a sound alerting the operator of the vehicle or a visual alert to the operator of the vehicle.

7. The method of claim 1, wherein the performing the operation if the vehicle is within the threshold distance of the stopping distance comprises engaging a brake of the vehicle or stopping the vehicle.

8. The method of claim 1, wherein the performing the operation if the vehicle is within of a threshold distance of the stopping distance comprises providing haptic feedback to the operator of the vehicle.

9. The method of claim 1, further comprising highlighting a plurality of objects in the image,
wherein the detecting the selection of the object in the image comprises detecting the selection of the object from among the plurality of highlighted objects in the image.

10. A non-transitory computer readable medium comprising instructions executable by a computer to perform the method of claim 1.

11. An apparatus for setting stopping distance, the apparatus comprising:
at least one memory comprising computer executable instructions; and
at least one processor configured to read and execute the computer executable instructions, the computer executable instructions causing the at least one processor to:
display, on a display, an image from a camera facing an area around a vehicle;
detect a user input to select an object in the displayed image;
determine a stopping distance from the selected object, the stopping distance corresponding to a pre-stored value or an input received from an operator of the vehicle;
compare a distance to the selected object and the stopping distance, the distance to the selected object being determined from information provided by an object detection sensor; and
based on the comparing, perform an operation if the vehicle is within a threshold distance of the stopping distance.

12. The apparatus of claim 11, wherein the computer executable instructions cause the at least one processor to determine the stopping distance by receiving an input including the stopping distance from the operator of the vehicle.

13. The apparatus of claim 12, wherein the computer executable instructions cause the at least one processor to receive the input via a touch screen display.

14. The apparatus of claim 13, wherein the computer executable instructions cause the at least one processor to receive the input via a displayed slider configured to adjust the stopping distance according to a touch input at the slider.

15. The apparatus of claim 11, wherein the computer executable instructions cause the at least one processor to highlight the selected object to visually distinguish a portion of the image including the selected object from another portion of the image.

16. The apparatus of claim 11, wherein the computer executable instructions cause the at least one processor to perform the operation if the vehicle is within the threshold distance of the stopping distance by outputting a sound alerting the operator of the vehicle.

17. The apparatus of claim 11, wherein the computer executable instructions cause the at least one processor to perform the operation if the vehicle is within the threshold distance of the stopping distance by providing haptic feedback to the operator of the vehicle or a visual alert to the operator of the vehicle.

18. The apparatus of claim 11, wherein the computer executable instructions cause the at least one processor to perform the operation if the vehicle is within the threshold distance of the stopping distance by engaging a brake of the vehicle, stopping the vehicle or controlling the vehicle to move to distance that is within the threshold distance of the stopping distance.

19. The apparatus of claim 11, wherein the computer executable instructions cause the at least one processor to highlight a plurality of objects in the image, and
wherein the computer executable instructions cause the at least one processor to detect the selection of the object in the image from among the plurality of highlighted objects in the image.

20. An apparatus for setting stopping distance, the apparatus comprising:
at least one memory comprising computer executable instructions; and
at least one processor configured to read and execute the computer executable instructions, the computer executable instructions causing the at least one processor to:
receive an image from a camera facing an area around a vehicle;
display, on a display, the image representing the area around a vehicle;
detect a user input to select an object in the displayed image representing the area around a vehicle;
set a stopping distance between the selected object and the vehicle based on an input received via a touchscreen from an operator of the vehicle;
compare a distance to the selected object and the stopping distance, the distance to the selected object being determined from information provided by an object detection sensor; and send the set stopping distance to the vehicle to perform an operation if the vehicle is within a threshold distance of the stopping distance.

\* \* \* \* \*